(12) United States Patent
Muller et al.

(10) Patent No.: US 8,706,326 B2
(45) Date of Patent: Apr. 22, 2014

(54) METHOD AND DEVICE FOR AIDING THE PILOTING OF AN AIRCRAFT DURING A LANDING PHASE

(71) Applicant: Airbus Operations (S.A.S.), Toulouse (FR)

(72) Inventors: Jean Muller, Tournefeuille (FR); Malika Essadouni, Tournefeuille (FR)

(73) Assignee: Airbus Operations (S.A.S), Toulouse (FR)

( * ) Notice: Subject to any disclaimer, the term of this patent is extended or adjusted under 35 U.S.C. 154(b) by 0 days.

(21) Appl. No.: 13/748,252

(22) Filed: Jan. 23, 2013

(65) Prior Publication Data
US 2013/0197727 A1 Aug. 1, 2013

(30) Foreign Application Priority Data
Jan. 24, 2012 (FR) ...................................... 12 50645

(51) Int. Cl.
*G01C 5/00* (2006.01)
(52) U.S. Cl.
USPC ................................................ 701/16; 701/9
(58) Field of Classification Search
USPC ....................................................... 701/9, 16
See application file for complete search history.

(56) References Cited

U.S. PATENT DOCUMENTS

| | | | |
|---|---|---|---|
| 6,991,304 B2 | 1/2006 | Villaume | |
| 7,014,146 B2 | 3/2006 | Villaume et al. | |
| 7,818,100 B2 * | 10/2010 | Goodman et al. | 701/16 |
| 8,386,094 B2 * | 2/2013 | DeVlieg et al. | 701/3 |
| 2007/0208466 A1 | 9/2007 | Meunier | |
| 2008/0234882 A1 * | 9/2008 | Villaume et al. | 701/9 |
| 2009/0292483 A1 * | 11/2009 | Journade et al. | 702/33 |
| 2010/0079308 A1 * | 4/2010 | Fabre et al. | 340/951 |
| 2010/0299004 A1 | 11/2010 | Hugues | |
| 2010/0299005 A1 * | 11/2010 | Hugues | 701/16 |
| 2012/0277937 A1 * | 11/2012 | Rado | 701/16 |
| 2013/0159477 A1 * | 6/2013 | Danielsson et al. | 709/220 |

FOREIGN PATENT DOCUMENTS

| | | |
|---|---|---|
| EP | 0025614 | 3/1981 |
| FR | 2817979 | 6/2002 |
| FR | 2857468 | 1/2005 |
| FR | 2895726 | 7/2007 |

OTHER PUBLICATIONS

French Search Report for FR 12 50645 dated Sep. 18, 2012.

* cited by examiner

*Primary Examiner* — Hussein A. Elchanti
(74) *Attorney, Agent, or Firm* — Jenkins, Wilson, Taylor & Hunt, P.A.

(57) ABSTRACT

Method and device for aiding the piloting of an airplane during a landing phase for ensuring, during rollout on a landing runway, that in the nominal case the airplane will stop level with a selected exit, while guaranteeing that in the case of a fault the airplane will stop before the end of the runway.

11 Claims, 1 Drawing Sheet

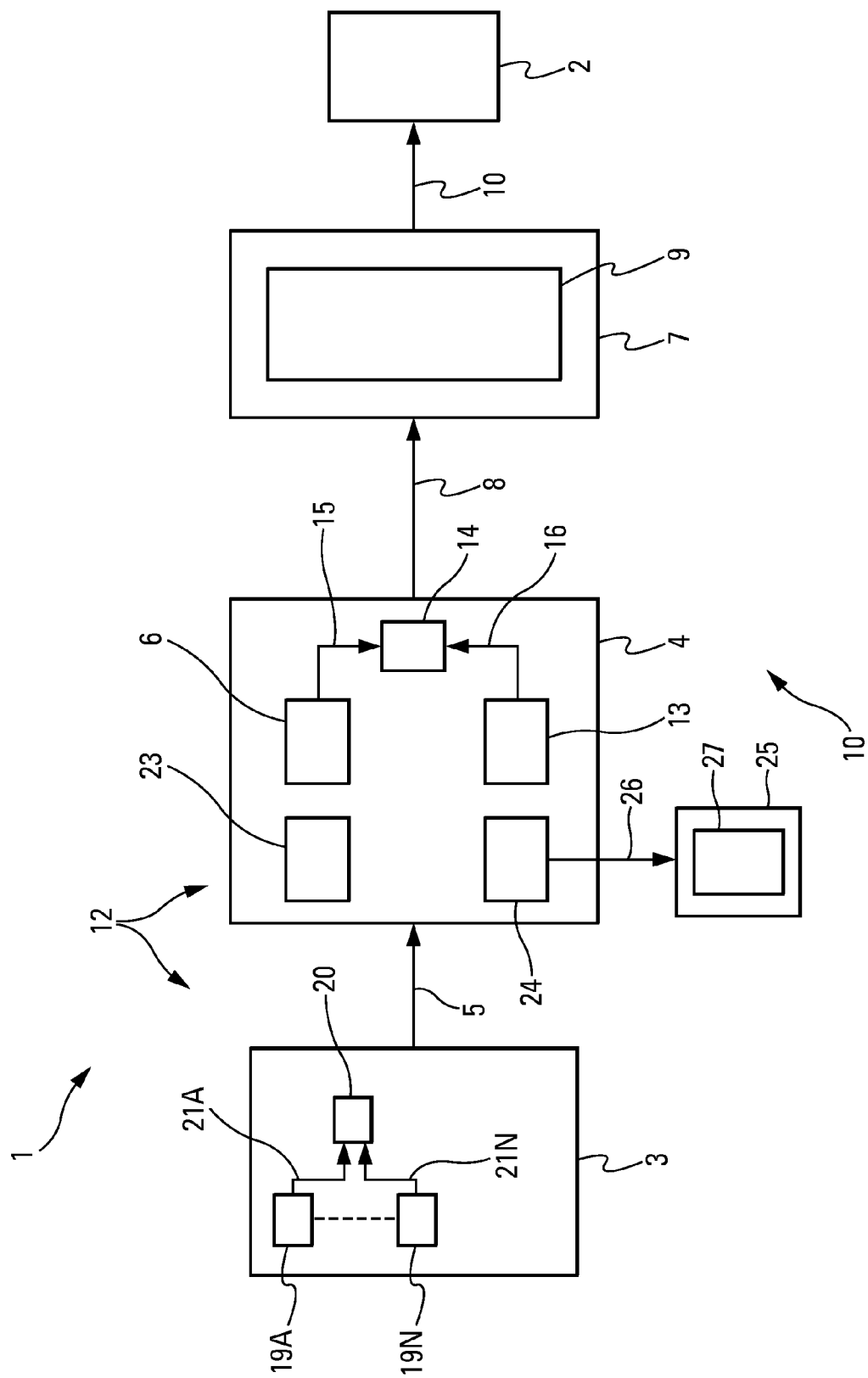

METHOD AND DEVICE FOR AIDING THE PILOTING OF AN AIRCRAFT DURING A LANDING PHASE

TECHNICAL FIELD

The present invention relates to a method and a device for aiding the piloting of an airplane, in particular of a civilian transport airplane, during a landing phase, said airplane being provided with an automatic braking system which is able to automatically brake the airplane on the ground.

BACKGROUND

Within the framework of automatic braking, a function termed BTV (for "Brake-To-Vacate") is known, the objective of which is to compute a controlled deceleration which will allow the airplane (rolling on a runway during landing) to stop automatically, level with an exit of the runway.

In particular, devices for automatic control of the deceleration of an airplane in the rollout phase which implement such a BTV function are known through documents FR-2 817 979 and FR-2 857 468. These devices allow the crew of the airplane to select an exit taxiway on the landing runway and to manage automatically and optimally (aid to the selection of a realistic exit taxiway compatible with known landing performance, minimization of runway occupation time, minimization of the necessary braking energy, improvement of comfort) the deceleration of the airplane during rollout on landing until the selected exit taxiway is attained. Consequently, under normal operational conditions, optimal attainment of this exit taxiway is guaranteed by virtue of these usual devices.

The computation of the aforementioned controlled deceleration is based mainly on the ground speed of the airplane and on the distances of the airplane and of the exit (selected by the pilot) with respect to the threshold of the runway.

SUMMARY

The present invention relates to a device for aiding the piloting of an airplane during a phase of landing on an airport, the object of which is to guarantee, with a high probability, compatible with the demands required during a landing, that the airplane will always stop before the end of the runway.

For this purpose, according to the invention, said device of the type provided with an automatic braking system which is able to automatically brake the airplane during the ground rollout on a landing runway, said braking system comprising:
  a flight controls computer, for computing a nominal deceleration making it possible, when it is applied to the airplane, to stop it level with a selected exit on the landing runway; and
  a braking computer, for computing, on the basis of a deceleration received, commands for control of means for braking the airplane, is noteworthy in that:
  said device moreover comprises:
  first means for providing data exhibiting a rate of occurrence of error or of alteration which is compatible with the safety objectives required on an airplane during a landing;
  second means for computing, on the basis of said data, a minimum deceleration making it possible to ensure that the airplane stops before the end of the landing runway, when this minimum deceleration is applied to said airplane; and
  third means for comparing said nominal deceleration with said minimum deceleration and for transmitting the higher deceleration to said braking computer; and
  said second and third means form part of said flight controls computer.

Said flight controls computer and said braking computer are DAL A certified according to standard DO-178B, that is to say to high integrity level.

Thus, by virtue of the invention:
  on the one hand, all the computations relating to the minimum deceleration are carried out in computers with high integrity level (DAL A certified), doing so on the basis of data which exhibit a high integrity level; and
  on the other hand, account is taken of the minimum deceleration (making it possible to ensure that the airplane stops before the end of the landing runway) if it is higher than said nominal deceleration (intended to stop the airplane level with a selected exit on the landing runway) which might be erroneous as indicated hereinabove.

These characteristics make it possible to guarantee, with a high probability which is compatible with the demands required during a landing, that the airplane will always stop before the end of the runway, that is to say it will not exit (longitudinally) the runway, in the case where a predetermined height (specified hereinafter) is cleared at the latest at the threshold of the runway.

Within the framework of the present invention, "high integrity level" of data (or of systems) is intended to mean that these data (or the data processed by these systems) exhibit a rate of occurrence (or probability of incidence) of error or of alteration, which is compatible with the safety objectives required on an airplane during a landing.

Advantageously, said data comprise at least one of the following data:
  a value of ground speed of the airplane;
  an estimation of the distance between the airplane and the threshold of the runway used for landing;
  a value of length of the runway used for landing.

Moreover, said first means comprise, in an advantageous manner, the following elements:
  a plurality of systems of inertial references able to generate ground speeds of the airplane, as well as passivation means for providing a ground speed as given data, solely in the case of consistency between the ground speeds arising respectively from said systems of inertial references, thereby making it possible to provide a ground speed which exhibits a high integrity level; and/or
  means which are integrated into said flight controls computer (with high integrity level) and which are formed so as to estimate the distance between the airplane and the threshold of the runway used for landing, by integrating a ground speed, thereby making it possible to compute and provide an airplane-threshold distance exhibiting a high integrity level.

Furthermore, advantageously, so as to be able to provide a value of runway length also exhibiting a high integrity level, said first means comprise:
  storage means which are integrated into said flight control computer and which store a value of length of the runway used for landing; and
  a display computer of the cockpit of the airplane which receives this value and displays it on a screen of the flight deck. Advantageously, this display computer is DAL A certified according to standard DO-178B.

As a matter of procedure, the pilot must then verify that the value displayed is indeed the same as that recorded on approach charts at his disposal, and if such is not the case, he must disengage the automatic braking function of BTV type used. This procedure thus ensures that the runway length value used in the computation of the minimum deceleration will likewise be of high integrity level.

Since all the data used for the computation of the minimum deceleration having to exhibit a high integrity level, use is made, according to the invention, either of data arising from computers with high integrity level, or of data which have been consolidated by an appropriate means (or procedure).

Moreover, advantageously, said second means compute said minimum deceleration on the basis of an estimation of the distance between the airplane and the threshold of the runway, and of the length of the runway, by implementing a usual deceleration law.

Furthermore, advantageously, the flight controls computer is a primary flight controls computer of the airplane.

The present invention also relates to a method for aiding the piloting of an airplane during a phase of landing on an airport, said airplane being provided with an automatic braking system which is able to automatically brake the airplane during the ground rollout on a landing runway and which comprises a flight controls computer and a braking computer, such as aforementioned.

According to the invention, said method is noteworthy in that:
also provided are:
first means for providing data exhibiting a rate of occurrence of error or of alteration which is compatible with the safety objectives required on an airplane during a landing;
second means for computing, on the basis of said data, a minimum deceleration making it possible to ensure that the airplane stops before the end of the landing runway, when this minimum deceleration is applied to the airplane; and
third means for comparing said nominal deceleration with said minimum deceleration and for transmitting the higher deceleration to said braking computer; and
said second and third means form part of said flight controls computer.

Moreover, the present invention also relates to an airplane, in particular a civilian transport airplane, which comprises a device for aiding piloting, such as that aforementioned.

BRIEF DESCRIPTION OF THE DRAWING

The single FIGURE of the appended drawing will elucidate the manner in which the invention may be embodied. This single FIGURE is the schematic diagram of a device for aiding piloting in accordance with the invention.

DETAILED DESCRIPTION

The device 1 in accordance with the invention and represented schematically in the FIGURE, is intended to aid the piloting of an airplane (not represented), in particular of a civilian transport airplane, during a landing phase, and more particularly while rolling on a landing runway after the actual landing.

The present invention is applied to an airplane which is equipped with an automatic braking system 10 (forming part of said device 1). In a usual manner, when it is activated, such an automatic braking system 10 automatically actuates braking means 2, such as brakes of the airplane A notably, with the aim of braking the airplane A during the ground rollout.

Said device 1 comprises, as represented in the FIGURE:

a set 3 of usual information sources, which are able to determine the current values of various parameters (position, speed, etc.) of the airplane A;
a DAL A certified flight controls computer 4, with high integrity level (of PRIM type on an A380 airplane), which is connected by way of a link 5 to said set 3 and which comprises usual means 6 able to implement a function of BTV type. More precisely, said means 6 are able to compute a nominal deceleration making it possible, when it is applied to the airplane (via the braking means 2), to stop it automatically level with a selected exit on the landing runway used. The device 1 also comprises means, not represented, allowing a pilot to arm the BTV function; and
a braking computer 7 likewise DAL A certified, therefore with high integrity level (of BCS type on an A380 airplane), which is connected by way of a link 8 to said computer 4 and which comprises usual means 9 for computing, on the basis of a deceleration received from the computer 4, commands for control of the airplane's braking means 2, which are transmitted to the latter via a link 10.

According to the invention, said device 1 moreover comprises:
means 12 for providing data exhibiting a high integrity level;
means 13 for automatically computing, on the basis of said data with high integrity level, a minimum deceleration making it possible to ensure that the airplane stops before the end of the landing runway, when this minimum deceleration is applied to said airplane; and
means 14 for automatically comparing said nominal deceleration (received via a link 15 from the means 6) with said minimum deceleration (received via a link 16 from the means 13) and for automatically transmitting to said computer 7 the higher deceleration of these two decelerations, with a view to its application to the airplane.

Moreover, according to the invention, as represented in the FIGURE, said means 13 and 14 form part of said DAL A certified computer 4 (therefore with high integrity level), preferably a primary flight controls computer. The DAL A certification is according to standard DO-178B.

This deceleration selected by the means 14 which is therefore dispatched to the (braking) computer 7 (of BCS type on an A380 airplane), ensures in the nominal case that the airplane will stop level with the exit selected in a usual manner by the pilot, while guaranteeing in the case of a fault (doing so with a high integrity level) that the airplane will stop before the end of the runway. This is guaranteed in the case where a predetermined height (specified hereinafter) is cleared at the latest at the threshold of the runway.

Indeed, by virtue of the invention:
on the one hand, all the computations relating to said minimum deceleration are carried out in high integrity level computers (DAL A certified), doing so on the basis of data which also exhibit a high integrity level, as specified hereinbelow; and
on the other hand, said minimum deceleration (making it possible to ensure that the airplane stops before the end of the landing runway) is taken into account if it is higher than said nominal deceleration (intended to stop the airplane level with a selected exit on the landing runway) which might be erroneous,
thereby making it possible to guarantee, with a high probability which is compatible with the demands required during a landing, that the airplane will always stop before the end of the runway, that is to say it will not exit (longitudinally) the runway.

Within the framework of the present invention, "high integrity level" of data [or of systems (computers 4 and 7)] is intended to mean that these data (or the data processed by these systems) exhibit a rate of occurrence of error or of alteration which is compatible with the safety objectives required on an airplane during a landing.

Moreover, said means 12 comprise:
a plurality of usual inertial reference systems 19A to 19N (of IRS type, DAL A certified), N being an integer greater than 1, able to generate in a usual manner ground speeds of the airplane; and
passivation means 20 which are connected by way of links 21A to 21N respectively to said inertial reference systems 19A to 19N and which are formed so as to verify these ground speeds and to provide a current ground speed as given datum, solely in the case of consistency between the ground speeds arising respectively from said inertial reference systems 19A to 19N, thereby making it possible to transmit to the computer 4 a ground speed which exhibits a high integrity level. In the case of inconsistency (entailing a ground speed communication defect), the function for computing minimum deceleration and thus the BTV function are no longer available.

Moreover, said means 12 also comprise means 23 which are integrated into said computer 4 and which are formed so as to estimate the distance between the airplane and the threshold of the runway used for landing, by integrating the ground speed received from the means 20. This makes it possible to compute and to provide an airplane-threshold distance also exhibiting a high integrity level.

The integrator carrying out the integration of the ground speed is initialized to zero as long as the threshold of the runway is not crossed. The estimation of the crossing of the runway threshold is based on the height of the airplane with respect to the ground. When the radio-altimetric height becomes less than a predetermined height (for example 50 feet), depending on the type of the airplane, the runway threshold is considered to be crossed.

This radio-altimetric height arising from computers with very high integrity level, the estimation of the airplane-runway threshold distance is therefore, likewise, of high integrity level.

Furthermore, the runway length being solely available in a database extracted by a computer with low integrity level (of OANS type on an A380 airplane), this datum may not be used as is. Hence, according to the invention, to be able to provide a value of runway length also exhibiting a high integrity level, said means 12 moreover comprise:
storage means 24 which are integrated into said computer 4 and which store a value of length of the runway (used for landing), as soon as the pilot arms the BTV function; and
a display computer 25 (for example of CDS type on an A380 airplane) with high integrity level (DAL A certified) which receives (via a link 26) this value and displays it on a screen 27 of the flight deck.

As a matter of procedure, the pilot must then verify that the value displayed on the screen 27 is indeed the same as that recorded on approach charts at his disposal. If such is not the case, he must disengage the automatic braking function (BTV function). This procedure thus ensures that the value of runway length, used in the computation of the minimum deceleration by the means 13, will likewise be of high integrity level.

The data used by the device 1 for the computation of the minimum deceleration having to exhibit a high integrity level, account is therefore taken, according to the invention, either of the data arising from high integrity level computers or of the data which have been consolidated by an appropriate means (or procedure).

Moreover, said means 13 compute said minimum deceleration on the basis of the estimation of the distance between the airplane and the threshold of the runway (received from the means 23) and on the basis of the length of the runway (received from the means 24), by implementing a usual deceleration law, such as indicated for example in document FR-2 903 801.

In particular, the minimum deceleration may be computed in accordance with an appropriate usual law of the type:
with constant deceleration;
with deceleration of ramp or ramp-plateau type, etc.

The invention claimed is:

1. A device for aiding the piloting of an airplane during a phase of landing on an airport, said device being provided with an automatic braking system which is able to automatically brake the airplane during the ground rollout on a landing runway, said braking system comprising:
a flight controls computer for computing a nominal deceleration that is calculated, when the nominal deceleration is applied to the airplane, to stop the airplane level with a selected exit on the landing runway; and
a braking computer, for computing, on the basis of a deceleration received, commands for control of a braking system of the airplane,
wherein:
said device moreover comprises:
a first component or procedure configured for providing data exhibiting a rate of occurrence of error or of alteration which is compatible with safety objectives required on an airplane during a landing;
a second component forming part of the flight controls computer configured for computing, on the basis of said data, a minimum deceleration calculated to ensure that the airplane stops before an end of the landing runway, when this minimum deceleration is applied to said airplane; and
a third component forming part of the flight controls computer configured for comparing said nominal deceleration with said minimum deceleration and for transmitting a higher of the nominal deceleration or the minimum deceleration to said braking computer.

2. The device as claimed in claim 1, wherein said data comprises at least one of the following data:
a value of ground speed of the airplane;
an estimation of a distance between the airplane and a threshold of the runway used for landing; and
a value of length of the runway used for landing.

3. The device as claimed in claim 1, wherein the first component comprises a plurality of inertial reference systems able to generate ground speeds of the airplane, as well as a passivation component for providing a ground speed as given data, solely in the case of consistency between the ground speeds arising respectively from said inertial reference systems.

4. The device as claimed in claim 1, wherein the first component comprises a fourth component which is integrated into said flight controls computer and which is formed so as to estimate a distance between the airplane and a threshold of the runway used for landing, by integrating a ground speed.

5. The device as claimed in claim 1, wherein the first component comprises:

a storage component which is integrated into said flight controls computer and which stores a value of a length of the runway used for landing; and a display computer in a cockpit of the airplane, which receives the value and displays it on a screen of a flight deck.

6. The device as claimed in claim 5, wherein the display computer of the cockpit of the airplane is DAL A certified according to standard DO-178B.

7. The device as claimed in claim 1, wherein the second component is configured to compute said minimum deceleration on a basis of an estimation of a distance between the airplane and a threshold of the runway and of a length of the runway, by implementing a deceleration law.

8. The device as claimed in claim 1, wherein the flight controls computer is a primary flight controls computer of the airplane.

9. The device as claimed in claim 1, wherein the flight controls computer and the braking computer are DAL A certified according to standard DO-178B.

10. A method for aiding the piloting of an airplane during a phase of landing on an airport, said airplane being provided with an automatic braking system which is able to automatically brake the airplane during the ground rollout on a landing runway, said braking system comprising the method of:

providing data from a first component or procedure a rate of occurrence of error or of alteration which is compatible with safety objectives required on an airplane during a landing;

computing a nominal deceleration in a flight controls computer that is calculated, when the nominal deceleration is applied to the airplane, to stop the airplane level with a selected exit on the landing runway;

computing in a second component forming part of the flight controls computer a minimum deceleration based on the data, which is calculated to ensure that the airplane stops before an end of the landing runway, when this minimum deceleration is applied to the airplane;

comparing in a third component forming part of the flight controls computer said nominal deceleration with said minimum deceleration and transmitting a higher deceleration, between the nominal deceleration and the minimum deceleration, to a braking computer; and controlling the braking system of the airplane by computing, in the braking computer, commands for controlling the braking system based on the higher deceleration received.

11. An airplane, which comprises a device for aiding piloting such as that specified under claim 1.

* * * * *